Jan. 23, 1968 R. A. LOGAN ET AL 3,365,630

ELECTROLUMINESCENT GALLIUM PHOSPHIDE CRYSTAL WITH THREE DOPANTS

Filed Jan. 29, 1965

INVENTORS R. A. LOGAN
F. A. TRUMBORE
H. G. WHITE
BY Wilford L. Wisner
ATTORNEY 3,365,630
Patented Jan. 23, 1968

3,365,630

ELECTROLUMINESCENT GALLIUM PHOSPHIDE CRYSTAL WITH THREE DOPANTS

Ralph A. Logan, Morristown, Forrest A. Trumbore, Plainfield, and Harry G. White, Bernardsville, N.J., assignors to Bell Telephone Laboratories, Incorporated, New York, N.Y., a corporation of New York

Filed Jan. 29, 1965, Ser. No. 428,904
6 Claims. (Cl. 317—237)

ABSTRACT OF THE DISCLOSURE

The technical disclosure is directed to a gallium phosphide crystal with three doping impurities distributed therethrough. The crystal exhibits an improved efficiency in the indirect light-emissive transitions and thereby the electroluminescence.

Figure 1:
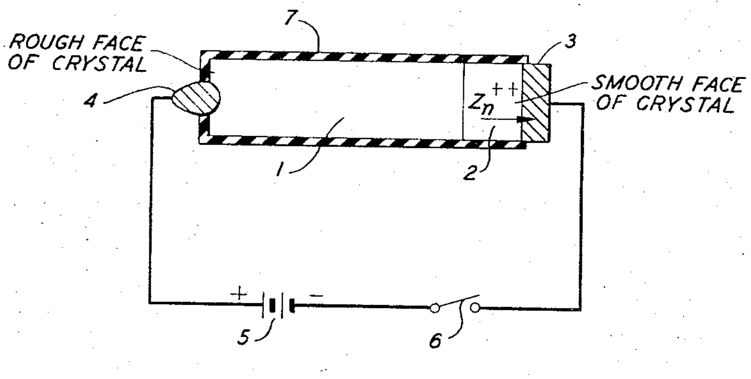

This invention relates to electroluminescent materials, particularly gallium phosphide crystals including appropriate impurities, to electroluminescent devices made from such materials and to methods for the preparation of such materials and devices.

While crystalline gallium phosphide including zinc and oxygen impurities has heretofore been used to produce red electroluminescence, the measured external quantum efficiency has generally been too low for practical applications. The prior art results that are reproducible have yielded efficiencies of the order of 0.01 percent. In those reported cases in which more practical efficiencies have been obtained, it has been difficult to reproduce the results. Although not certain whether the difficulty lies in material preparation or device fabrication, applicants have recognized that improvements in the material may make other difficulties easier to eliminate or tolerate.

Accordingly, it is an object of this invention to provide a material particularly well suited for electroluminescent devices.

A further object of this invention is to provide a material from which electroluminescent devices can be easily fabricated.

According to one aspect of the invention, applicants have discovered that the addition of an appropriate amount of tellurium to a gallium phosphide crystal including oxygen and zinc or cadmium tends to increase significantly the efficiency of electroluminescence obtainable in response to injection of charge carrier. Moreover, it appears that the addition of appropriate amounts of donors, such as sulfur or selenium, also are effective, to a lesser extent, for this purpose. Further, by the addition of tellurium or similar donor, useful electroluminescence appears to be realizable over a wider range of zinc and oxygen concentrations than had previously been the case.

The embodiments to be discussed in detail will include tellurium as the added donor, inasmuch as it has been found to be the preferred dopant. However, statements involving tellurium are generally applicable to situations in which sulfur or selenium replace or supplement tellurium.

Gallium phosphide crystals including zinc, oxygen and a donor taken from the group of selenium, sulfur, and tellurium as the dopants can be utilized in two main classes of devices. The first employs a p-n junction in the crystal: the second employs a surface barrier layer. The materials aspect of the invention permits the fabrication of either class of device and with relative ease.

For example, in fabricating the p-n junction device, a region of opposite type conductivity is formed in the bulk material by outdiffusing or gettering zinc from a localized region so that the tellurium, or selenium or sulfur in appropriate cases, tends to predominate in that region. The outdiffusing or gettering can be accomplished at temperatures below those needed for crystal growth.

In fabricating the barrier layer device, this ease of fabrication results from the inherent presence of a suitable barrier layer on a gallium phosphide crystal including appropriate impurities. A contact can be deposited over this layer at room temperature.

For both types of devices, red electroluminescence has been observed with an externally measured quantum efficiency ranging up to 0.3 percent. In some instances, with different amounts of dopants, green electroluminescence has been observed.

Available evidence indicates that in the finished crystals the concentration of tellurium or corresponding donor is intermediate between the concentrations of zinc and electrically active oxygen, although this relationship need not exist between the concentrations of zinc, oxygen and tellurium in the original mixture or melt from which the crystals are grown. By electrically active oxygen, applicants mean that dissolved oxygen that assists in the radiative recombination process. For participating in electroluminescence, the electrically active oxygen concentration may be well below the level that measurably affects the conductivity of the crystal.

Figure 2:
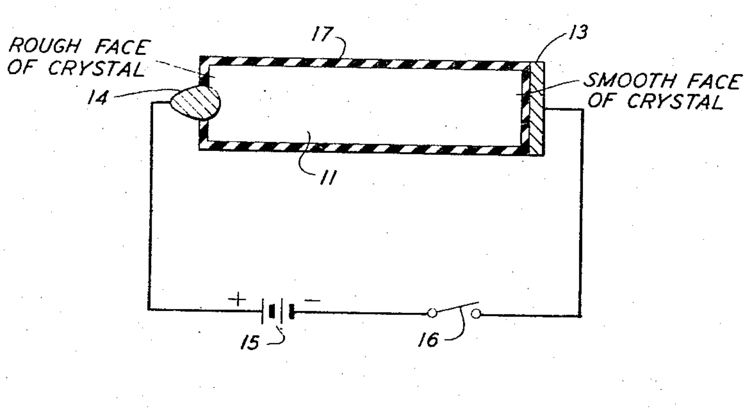

Further details are set out in the following detailed description; and the devices made from the new material are shown in the drawing in which:

FIG. 1 is an illustration of an electroluminescent p-n junction device made from a gallium phosphide crystal partially gettered of zinc near one electrode; and FIG. 2 is an illustration of an electroluminescent device utilizing charge carrier injection through a surface barrier layer upon a gallium phosphide crystal.

The most typical mixture from which gallium phosphide crystals were grown, in accordance with the materials aspect of the invention, included 15 grams Ga, 3 grams GaP (12 mole percent), 0.0072 gram Zn (0.05 mole percent), 0.0040 gram $Ga_2O_3$ (0.01 mole percent) and 0.0027 gram Te (0.01 mole percent).

In other examples, the proportions of zinc, tellurium and gallium oxide were as shown in the following table:

TABLE

| Example No. | Mole, Percent Zn(Cd) | Mole, Percent Te | Mole, Percent $Ga_2O_3$ | Visually Observed Color of Device Electroluminescence |
|---|---|---|---|---|
| 1 | 0.05 | 0.01 | 0.01 | Red. |
| 2 | 0.08 | 0.04 | 0.01 | Red. |
| 3 | 0.05 | 0.01 | 0.01 | Red. |
| 4 | 0.04 | 0.0066 | 0.01 | Red. |
| 5 | 0.04 | 0.0033 | 0.01 | Red. |
| 6 | 0.04 | 0.02 | 0.01 | Red. |
| 7 | 0.05 | 0.0066 | 0.01 | Red. |
| 8 | 0.05 | 0.0033 | 0.01 | Red. |
| 9 | 0.1 | 0.02 | 0.01 | Red. |
| 10 | 0.05 | 0.01 | 0.02 | Yellow-Red. |
| 11 | 0.05 | 0.01 | 0.05 | Do. |
| 12 | 0.05 | 0.01 | 0.07 | Red-Orange. |
| 13 | 0.05 | 0.01 | ---------- | Green. |
| 14 | 0.1 | 0.005 | ---------- | Do. |
| 15 | 0.05 | 0.01 | ---------- | Do. |
| 16 | 1.5 | 0.2 | ---------- | Do. |
| 17 | 0.5 | 0.1 | ---------- | Do. |
| 18 | 0.7 | 0.1 | ---------- | Do. |
| 19 | (7.0) | 0.005 | 0.01 | Deep Red. |
| 20 | (7.0) | 0.01 | 0.01 | Do. |

It should be noted that the foregoing results indicate that the partially compensating effect of the tellurium allows the zinc concentration to be increased beyond the limits heretofore utilized without quenching electroluminescence. The prior art limits upon the zinc concentration favorable to the production of electroluminescence are indicated in the article, "Injection Electroluminescence at P-N Junctions in Zinc-Doped Gallium Phosphide" by J. Starkiewicz and J. W. Allen, in the Journal of Physics and Chemistry of Solids, vol. 23, 1962, pp. 881–884.

In a material according to the present invention, the partially compensating effect of the added donor, such as tellurium, appears to allow the zinc concentration to be increased to higher levels, apparently to its solubility limit in the presence of oxygen and the added donor without quenching electroluminescence, provided that the number of acceptor atoms exceeds the number of donor atoms so that the material remains p-type. It further appears that the added donor tends to increase the solubility of zinc in the gallium phosphide crystal. At the lower limits of concentration favorable to the production of electroluminescence, it appears sufficient that the zinc and tellurium have concentrations just great enough measurably to affect the conductivity of the gallium phosphide crystal. It appears that the foregoing examples inherently provide a concentration of the acceptor impurity between approximately $1\times10^{17}$ atoms per cubic centimeter and approximately $5\times10^{18}$ atoms per cubic centimeter.

Moreover, the added donor, such as tellurium, allows the electrically active oxygen concentration to be varied from a level below that measurably affecting the conductivity of the crystal up to relatively high levels without quenching electroluminescence. This range of electrically active oxygen concentration is wider than in the prior art, even though the electrically active oxygen concentration appears always to be less than the zinc and tellurium concentrations. The lower limit of the oxygen that needs to be present is quite low, as evidenced by Examples 13–18 in which no oxygen was deliberately added to the melt, the oxygen need apparently being satisfied either by oxygen diffusing out from the silica tube in which the melt was heated or by trace amounts present in the materials melted.

In Examples 19 and 20, cadmium was added to the melt instead of zinc.

Other examples not described in detail indicate that sulfur and selenium may be used to replace or supplement the tellurium.

It will be convenient to describe as significant the amounts of oxygen, zinc or cadmium and the donor impurity that need be present to achieve useful electroluminescence as discussed hereinbefore.

Both a p-n junction diode and an electroluminescent diode utilizing charge carrier injection through a surface barrier layer were fabricated from crystals grown from mixtures according to the first example set out in the table above. With forward bias, the external quantum efficiencies of both of these devices were measured with a silicon solar cell to be near 0.3 percent.

All of the crystals grown from the mixture described in Examples 2–20 were fabricated into electroluminescent diodes using charge carrier injection through a surface barrier layer, as described hereinafter. In addition, crystals grown according to Examples 15 and 16 were also made into electroluminescent p-n junction.

For Examples 2–8, the diodes had external quantum efficiencies measured by a silicon solar cell to be between 0.1 percent and 0.4 percent. The efficiencies tend to increase with forward-bias current up to a current of a few milliamperes and then decrease.

For Examples 9–15, the diodes had external quantum efficiencies measured by a silicon solar cell to be less than 0.1 percent but more than 0.01 percent.

For Examples 16–18, the external efficiencies were not directly measured but were visually judged equal to those Examples 9–15.

For Examples 19 and 20, the diodes had external quantum efficiencies measured by a silicon solar cell to be about 0.15 percent.

For the Examples 1–18 diodes of either type emit a broad red band, 1.79 ev. (7000 A.) at 298° K., which by comparison with photoluminescence results on these and similar crystals is due to recombination at deep donor (oxygen)—shallow acceptor (zinc) pairs in bulk p-type material. Also emitted is some green light of energy 2.1 ev. (6000 A.) at 298° K., which may cause the total emitted radiation to be yellow-green or red-orange as in Examples 10–12. The electroluminescent diodes as made from crystals grown from mixtures according to Examples 13–18 emitted green light that was visually dominant over the red light.

The preferred process for growing the crystals from these melts was the following:

(1) Gallium was placed either in a silica tube or in a boron nitrite crucible contained in a silica tube.

(2) The tube was heated under vacuum to a temperature between 500° C. and 600° C.

(3) The tube was removed from the vacuum system and the GaP, Zn, Te and $Ga_2O_3$ were added in the proportions specified in the examples set out above.

(4) The tube was evacuated and sealed under vacuum.

(5) The tube was placed in a furnace, and the mixture was heated to its melting point. For the mixtures including 12 mole percent of gallium phosphide, the melting point is 1200° C. In general, the gallium phosphide and doping impurities should be completely dissolved in the liquid phase. The period of time for which the melt was maintained at this temperature was not critical and typically was 1–12 hours.

(6) The temperature was lowered, typically at a rate of about 60° C. per hour until a temperature below 900° C. was reached. The cooling rate was not critical. Rates at least as low as 5° C. per hour and as high as 80° C. per hour apparently can be used.

(7) The tube was then removed from the furnace, and the crystals were recovered by dissolving in hydrochloric acid.

The crystals obtained were observed to have a smooth face (the 1–1–1 face) and a rough face.

The various parameters of the steps discussed, such as temperatures and times, were found not to be critical. Moreover, crystals having the impurities desired can be made by other known processes so long as appropriate amounts of the desired impurities are combined.

Other donors of the group consisting of tellurium, sulfur or selenium could be added as part of step 3 above.

A particularly noteworthy characteristic of the crystals obtained was found to be an inherent surface barrier layer that could not be eliminated with any of the standard etchants. While the exact composition of this surface barrier could not readily be determined, it appears to be either an intrinsic or lightly doped GaP layer or an oxide layer. Capacitance measurements indicate that its thickness is not appreciably greater than 200 A. in any case.

As discussed hereinbefore, two kinds of electroluminescent devices or cells were made from the doped gallium phosphide crystal. The added donor impurity such as tellurium contributes to the ease with which these devices can be made.

For example, in FIG. 1 is shown a p-n junction device that comprises a crystal having the bulk p-type region 1 and the inherent surface barrier 7 that are characteristic of a crystal made by the foregoing process with impurities as described. A contact or electrode 4 penetrates the barrier 7 and contacts the rough face of the bulk p-type region 1. A contact or electrode 3 penetrates the barrier 7 and makes an area contact on the smooth face to an n-type region 2, which is formed as described hereinafter. A battery 5 is connected serially with a switch 6 between the electrodes 3 and 4 in a polarity to inject electrons from the electrode 3 through the n-type region 2.

In one embodiment of this kind, the crystal was 6 mils thick by 30 mils wide by 250 mils long with somewhat irregular shape. The 6 mil dimension was placed between the electrodes. The electrode 3 was gold film $10^4$ A. thick, evaporated onto the crystal at 600° C., and the contact 4 was gold-beryllium alloyed into the bulk p-type material 1 at 600° C. to make a low resistance contact thereto. Tests indicated that the device had the characteristics of a p-n junction diode with rectification occurring in the vicinity of the gold film electrode 3. The quantum efficiency of red electroluminescence of this device was measured with a silicon solar cell to be near 0.3 percent when the battery 5 supplied two milliamperes through the device and 1.7 volts across the electrodes. The measured efficiency increased with bias current up to a few milliamperes and thereafter decreased as bias current was increased further.

The electrode 4 was replaced in various examples with silver paste, gallium ultrasonically wetted to the crystal, or metal points of various materials, all with successful results. It appears not to be necessary that electrode 4 form an ohmic or low resistance contact to the bulk p-type region 1, although an ohmic contact can readily be made by employing sufficient temperature or pressure that the electrode material penetrates the barrier layer 7 and any n-type layer that may have been formed before its placement, as will be explained hereinafter.

The electrode 3 was replaced with silver paste, gallium, or a metal point in various examples, all with successful results. In each example the electrode 3 was applied with sufficiently low temperatures and pressures that it did not completely penetrate the n-type region 2. In another example, electrode 3 was formed by tin evaporated at 600° C. onto the smooth surface of the crystal, with successful results.

The n-type region 2 is formed as a result of heating the crystal at a temperature and for a time that permits diffusion of a portion of the zinc to the surface where it may be removed by evaporation into a vacuum or gettered, for example, in a liquid metal-semiconductor phase. Since zinc is the most mobile of the impurities the temperature chosen for zinc outdiffusion can be one for which the oxygen and tellurium are relatively immobile. Inasmuch as the crystal is partially compensated with the tellurium impurity, the outdiffused zinc leaves a relatively heavily doped n-layer, thus forming a p-n junction.

The n-type region 2 in specific examples has been formed by gettering zinc in a gold or tin film 3 at 600° C. whereby the n-type region is localized as indicated in FIG. 1. It appears that other materials could be used as getters of the outdiffused zinc. The region 2 has also been successfully formed by evaporating the outdiffused zinc into a vacuum at 600° C., whereby the n-type region has been formed generally over the surface. The electrode 4 then preferably penetrates the n-type layer on the rough face, as discussed above.

As previously discussed, the crystals grown in the manner described can also be utilized to make surface barrier diodes of the kind shown in FIG. 2.

The diode shown in FIG. 2 comprises a gallium phosphide crystal prepared in the manner described previously so that it includes the bulk p-type material 11 and, thereover, the thin surface film or barrier layer 17 of the kind described as inherently present. An electrode 14 penetrates the barrier 17 and contacts the rough face of the bulk p-type material 11. An electrode 13 overlies an area of the barrier 17 on the smooth face of the crystal. A battery 15 is connected serially with a switch 16 between the electrodes 13 and 14 with a polarity to inject electrons from the electrode 13 through the surface barrier 17 into the bulk p-type material 11.

In one typical diode of this kind, the crystal measured 7 mils thick by 300 mils wide by 300 mils long, with somewhat irregular shape. The 7 mil dimension was placed between the electrodes. The contact 14 was gold-beryllium alloyed into the rough face of the bulk p-type material 11 at 600° C. to make a low resistance connection thereto. The crystal was then cooled to room temperature, the contact 14 was protected with a coating of paraffin or wax, the crystal was chemically etched and turner over, and a gold film was evaporated onto the smooth surface at room temperature to form electrode 13. The quantum efficiency of red electroluminescence of this device was measured with a silicon solar cell to be near 0.3 percent when the battery 15 supplied 2 milliamperes through the device and about 3.4 volts across its electrodes. The measured efficiency increased as current was increased a few milliamperes and thereafter decreased with increase in current.

The nature of electrode 14 is not critical and can be either an ohmic contact or almost any non-ohmic contact. It has been successfully replaced in various examples with silver paste, gallium ultrasonically wetted to the crystal, or metal points of various materials. It is not necessary that it penetrate the barrier layer, since it merely provides a path for current flow.

The electrode 13 has been replaced successfully with silver paste, gallium, or a metal point, in each case applied with sufficiently low temperatures and pressures that it did not penetrate the barrier layer 17.

It is noted that in the absence of the barrier 17 between the bulk p-type material 11 and the electrode 13, a Schottky barrier would form on the adjacent gallium phosphide; and only majority carriers, in this case, holes, would flow into the crystal, thus not initiating electron-hole recombination in either direction of bias.

In contrast, in a device according to FIG. 2, electrons are injected from the electrode 13 through the barrier layer 17, presumably by "tunneling," or perhaps by field emission across a high field region near the surface, into the p-type crystal 11, thereby producing electroluminescence associated with electron-hole recombination.

By "tunneling," applicants refer to the physical phenomenon in which an electron coming very near to a very thin energy barrier, such as barrier layer 17, has some probability of appearing on the other side of the barrier regardless of the velocity or thermal energy of the electron.

It is particularly noted that the surface barrier layer 7 or 17 inherently formed on a gallium phosphide crystal doped with zinc, oxygen and a donor such as tellurium is thinner and more uniform than the insulating films deposited by evaporation in making prior art gallium phosphide devices.

What is claimed is:

1. A gallium phosphide crystal that includes means for producing light by radiative recombination upon the application of electrical energy, said light-producing means including throughout the bulk of said crystal an acceptor impurity selected from the group consisting of zinc and cadmium in a concentration between approximately $1\times10^{17}$ and approximately $5\times10^{18}$ atoms per cubic centimeter and including throughout the bulk of the crystal oxygen as a donor impurity in an electrically active concentration cooperative with said acceptor impurity in said recombination which concentration is less than said acceptor impurity concentration, said crystal including throughout the bulk thereof a donor impurity selected from the group consisting of tellurium, sulfur and selenium in a concentration less than said acceptor impurity concentration and more than said electrically active oxygen concentration.

2. A gallium phosphide crystal according to claim 1 in which the acceptor impurity is zinc and the selected donor impurity is tellurium.

3. A gallium phosphide crystal according to claim 1 in further combination with means for applying the electrical energy to the crystal.

4. A gallium phosphide crystal according to claim 3 in which the light-producing means and the selected donor impurity inherently provide a barrier layer upon the surface of the crystal and the energy applying means comprises a pair of electrodes attached to the crystal, one of said electrodes being superimposed upon said barrier layer.

5. A gallium phosphide crystal according to claim 3 in which the electrical energy applying means comprises a first electrode forming an ohmic contact to the bulk of said crystal and a second rectifying electrode forming a contact to a region of said crystal from which zinc has been outdiffused in amounts that permit said oxygen and tellurium locally to predominate.

6. A gallium phosphide crystal according to claim 1 in further combination with electrodes for applying the electrical energy to the crystal, one of the electrodes forming an ohmic contact to said crystal and the other of said electrodes being coupled to said crystal through an insulating film of not more than 200 A. thickness that is inherently formed on the surface of the crystal by the light-producing means and the selected donor impurity.

References Cited

UNITED STATES PATENTS

| | | | |
|---|---|---|---|
| 2,858,275 | 10/1958 | Folberth | 317—237 |
| 3,245,002 | 4/1966 | Hall | 317—235 |

FOREIGN PATENTS

| | | |
|---|---|---|
| 719,873 | 3/1952 | Great Britain. |

OTHER REFERENCES

Physics Letters (vol. 8, No. 4), Feb. 15, 1964, pp. 233–235, an article by Grimmeiss and Scholz, "Efficiency of Recombination Radiation in GaP."

JAMES D. KALLAM, *Primary Examiner.*